Oct. 8, 1929.  T. F. ROCHESTER  1,731,061
SEPARATOR OF LIQUIDS FROM GASES
Filed Dec. 14, 1927
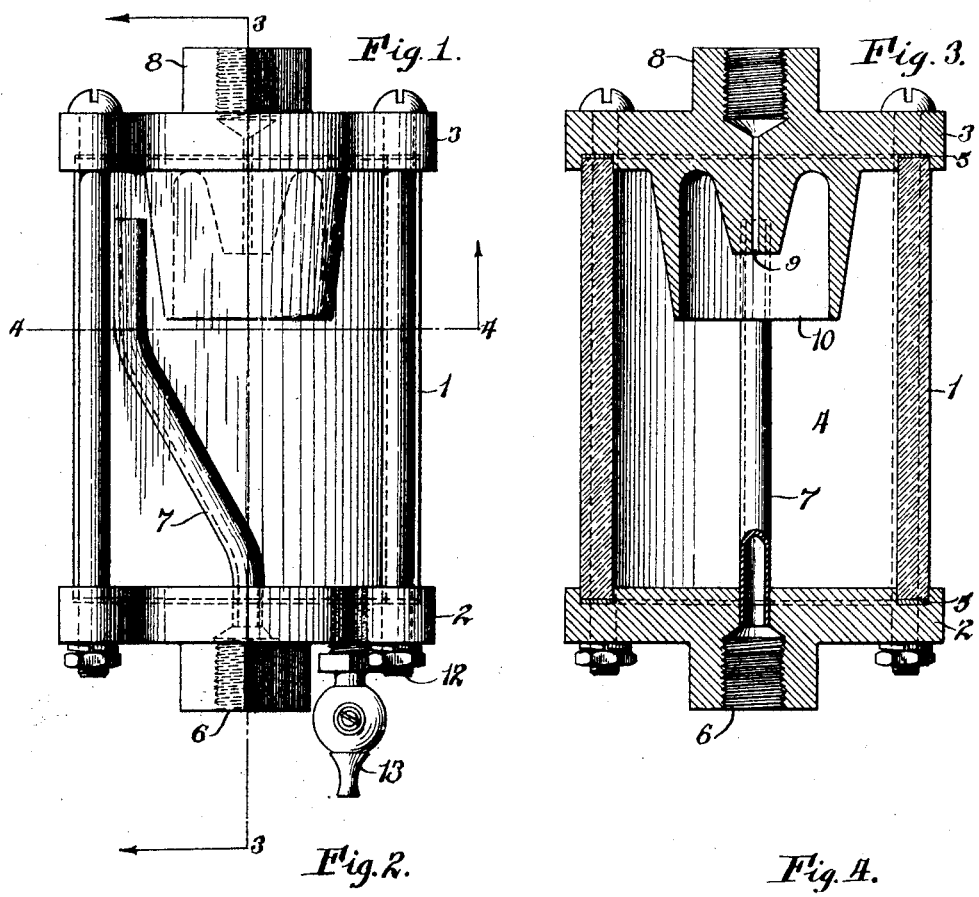
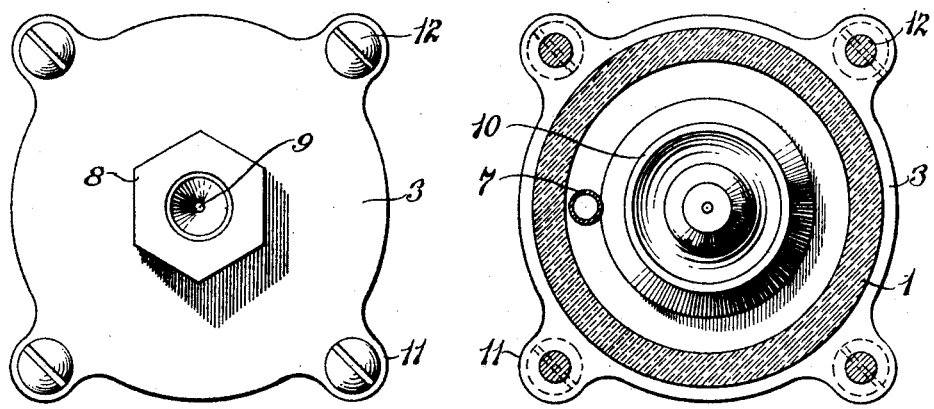
Inventor
Thomas F. Rochester
By Popp and Powers
Attorney Patented Oct. 8, 1929

1,731,061

UNITED STATES PATENT OFFICE

THOMAS F. ROCHESTER, OF EAST AURORA, NEW YORK, ASSIGNOR TO KORECT AIR METER CORPORATION, OF BUFFALO, NEW YORK, A CORPORATION OF NEW YORK

SEPARATOR OF LIQUIDS FROM GASES

Application filed December 14, 1927. Serial No. 240,022.

This invention relates to improvements in devices for separating liquids from flowing gases including air.

Devices for the purpose stated as known in the art, consist generally in a chamber provided with gas inlet and outlet openings and a barrier interposed between said openings. In the operation of these devices the flowing stream of gas is caused to impinge against the chamber walls whereby the contained liquid is condensed and deposited on the walls while the gas passes around the barrier to the outlet opening. While the perfect separation of the liquid from the gas is practically impossible with such devices, I have discovered that the efficiency of such separation is very materially increased by restricting the outlet opening with respect to the inlet opening and it is to such improvement that the present invention is principally directed.

An embodiment of my invention is disclosed in the accompanying drawings, wherein:

Figure 1 is a side elevation of the device.
Figure 2 is a top plan view.
Figure 3 is a section along line 3—3 of Fig. 1.
Figure 4 is a section along line 4—4 of Fig. 1.

The device consists generally of a casing 1, preferably made of glass, having a lower head 2 and an upper head 3 all of which outline a chamber 4. Each head has an annular recess 5 into which the adjacent end of the casing is fitted, suitable packing being interposed to prevent the escape of the gas.

The lower head 2 is provided with an inlet nipple 6 by which the device may be connected to the gas supply line. The inner end of the nipple 6 communicates with a tube 7 which extends upwardly within the casing to appoint at one side of and adjacent to the upper head, 3.

The upper head 3 is provided with an outlet nipple 8 by which the device may be connected to the gas feed line. The upper head is also formed with a restricted passage 9, the inner and outer ends of which communicate with the chamber 4 and outlet nipple 8 respectively. A barrier is interposed between the discharge end of said tube and the passage 9 and is constituted by an annular flange 10 depending from the upper head 3.

Both heads are further provided with lugs 11 having suitable openings for the accommodation of bolts 12 by which the device is held together. If desired a drain cock 13 may be secured to the lower head for draining the chamber 4 of any liquid accumulation.

In operation, the device is essentially a part of the gas feed line, the gas being admitted under pressure to the inlet nipple 6 and passing upwardly through the tube 7 where it impinges with such force upon the upper head 3 that any particles of liquid which it may hold in suspension are condensed, so to speak, upon the surface of said head. The liquid, thus separated, trickles down the sides of the barrier 10 and drops to the bottom of the chamber 4 while the gas passes around the barrier 10 through the restricted opening 9 and outlet nipple 8 to the gas feed line.

By restricting the outlet opening relatively to the inlet, a relative back pressure in the chamber is built up which has been found to increase the efficiency with which the moisture is separated from the gas and to insure that the gas delivered at the discharge end of the feed line shall be substantially free from moisture.

The device may of course, be used in various environments. One example of its use is in connection with the air feed hose of a tire charging or filling device where it is desirable to free the air from the oil which it has taken up in connection with the operation of the compressor.

Having described my invention, I claim:
A device of the class described comprising a chambered casing having an upper and a lower closure, a gas inlet opening formed in said lower closure, an inlet tube communicating with said inlet opening and the upper part of said chamber, said tube being disposed to direct the gas against an upper wall of the chamber, a gas outlet opening formed in said upper closure and a flange secured to said upper closure and positioned between the upper opening of said tube and said outlet opening to provide a tortuous path therebetween, said outlet opening being restricted relatively to the inlet opening.

In testimony whereof I affix my signature.

THOMAS F. ROCHESTER.